United States Patent
Kim et al.

(10) Patent No.: US 9,946,440 B2
(45) Date of Patent: Apr. 17, 2018

(54) METHOD OF PROVIDING FLASH CARD AND APPARATUSES PERFORMING THE SAME

(71) Applicant: CHUNGDAHM Learning, Inc., Seoul (KR)

(72) Inventors: Jun Su Kim, Seoul (KR); Sung Hoon Chun, Eunpyeong-gu (KR); Young Nam Kim, Seoul (KR); Mu Jung Kim, Seoul (KR); Tae Jung Kim, Gyeonggi-do (KR)

(73) Assignee: CHUNGDAHM Learning, Inc., Seoul (KR)

( * ) Notice: Subject to any disclaimer, the term of this patent is extended or adjusted under 35 U.S.C. 154(b) by 341 days.

(21) Appl. No.: 14/263,188

(22) Filed: Apr. 28, 2014

(65) Prior Publication Data

US 2015/0074553 A1    Mar. 12, 2015

(30) Foreign Application Priority Data

Sep. 10, 2013    (KR) .................... 10-2013-0108716

(51) Int. Cl.
*G09B 7/00*    (2006.01)
*G06F 3/0483*  (2013.01)
(Continued)

(52) U.S. Cl.
CPC .......... *G06F 3/0483* (2013.01); *G06F 3/0484* (2013.01); *G06Q 10/101* (2013.01);
(Continued)

(58) Field of Classification Search
None
See application file for complete search history.

(56) References Cited

U.S. PATENT DOCUMENTS 8,442,423 B1 *  5/2013  Ryan .................. G09B 7/00
                                                434/322
8,706,685 B1 *  4/2014  Smith ............ G06F 17/30882
                                                707/608
(Continued)

FOREIGN PATENT DOCUMENTS

| JP | 2007-003691 A | 1/2007 |
| KR | 10-2002-0002102 A | 1/2002 |
| KR | 10-2012-0134054 A | 12/2012 |

OTHER PUBLICATIONS

Discovery Byte, "Discovery Byte Discovery FlashCards", 2011 http://discoverybyte.com/Discovery_FlashCards.aspx.*
(Continued)

*Primary Examiner* — Jennifer N To
*Assistant Examiner* — Beau Spratt
(74) *Attorney, Agent, or Firm* — Maginot, Moore & Beck LLP

(57) ABSTRACT

A method of providing a flash card and apparatuses for performing the method are disclosed. A method of providing a flash card in a learning system including a first terminal and second terminals may include creating, by the first terminal, a first flash card associated with a corresponding page of an electronic book (e-book) currently being displayed on a display of the first terminal, and transmitting, by the first terminal, the first flash card to the second terminals.

15 Claims, 18 Drawing Sheets

(51) Int. Cl.
  *G06F 3/0484* (2013.01)
  *G06Q 50/00* (2012.01)
  *G06Q 50/20* (2012.01)
  *G06Q 10/10* (2012.01)
  *G06F 9/44* (2018.01)
(52) U.S. Cl.
  CPC .............. *G06Q 50/01* (2013.01); *G06Q 50/20* (2013.01); *G09B 7/00* (2013.01); *G06F 9/4443* (2013.01)

(56) References Cited

U.S. PATENT DOCUMENTS

| | | | | |
|---|---|---|---|---|
| 8,832,584 B1* | 9/2014 | Agarwal | ............... | G06F 3/0483 715/776 |
| 9,053,500 B2* | 6/2015 | Etesse | ................... | G06Q 30/06 |
| 2003/0180703 A1* | 9/2003 | Yates | ...................... | G09B 7/00 434/353 |
| 2010/0279264 A1* | 11/2010 | Barazanji | ............... | G06Q 10/10 434/322 |
| 2011/0066683 A1* | 3/2011 | Laude | ..................... | G09B 7/02 709/204 |
| 2011/0318723 A1* | 12/2011 | Jeong | ...................... | G09B 7/08 434/350 |
| 2012/0231441 A1* | 9/2012 | Parthasarathy | .......... | G09B 7/02 434/362 |
| 2015/0186346 A1* | 7/2015 | Mesguich Havilio | ............... | G06F 3/04842 715/256 |

OTHER PUBLICATIONS

International Search Report of PCT/KR2013/009648.
Flashcards Delux, Yongi's Power Blog. Feb. 21, 2014. http://blog.naver.com/rhfahrsu/10141537936.

* cited by examiner

FIG. 5
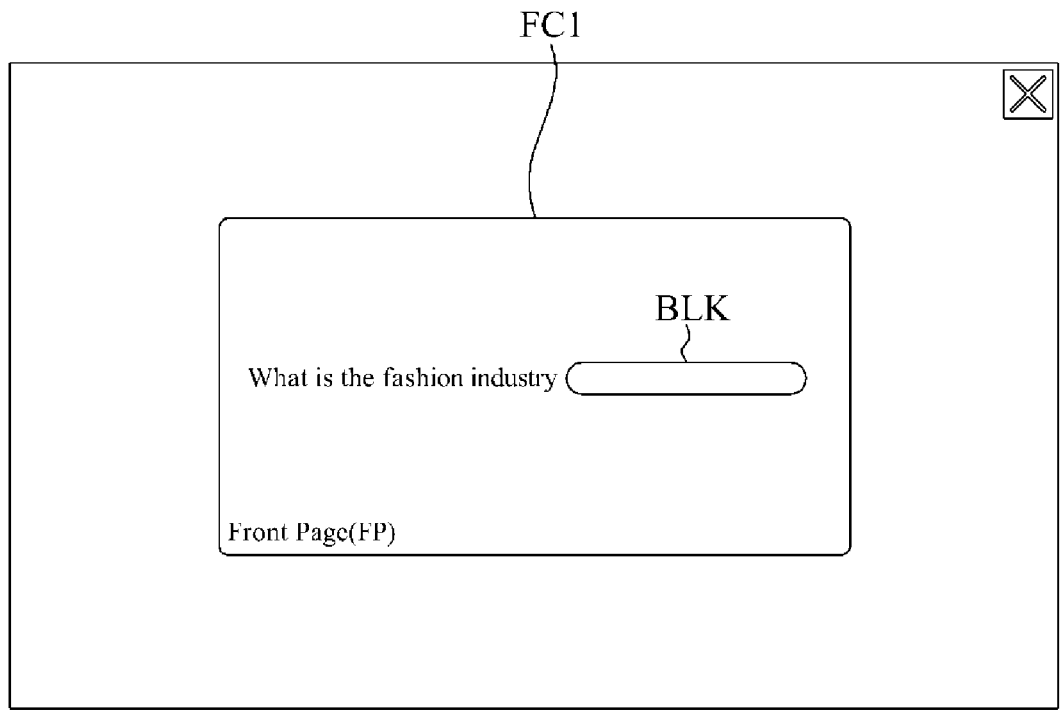
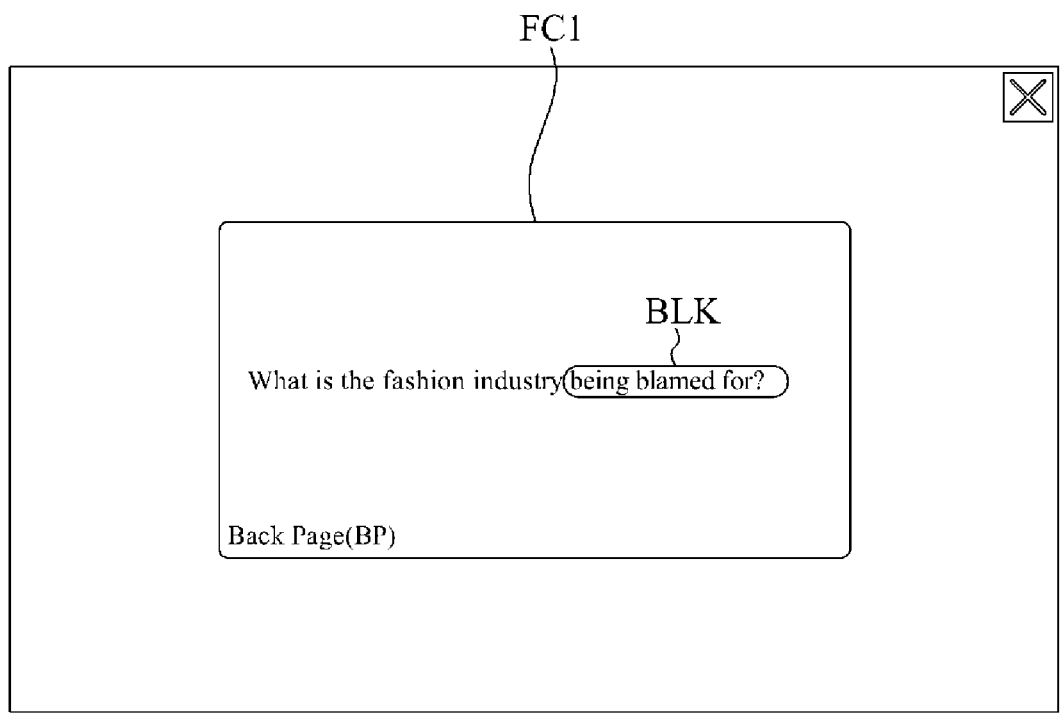

FIG. 6

FIG. 7
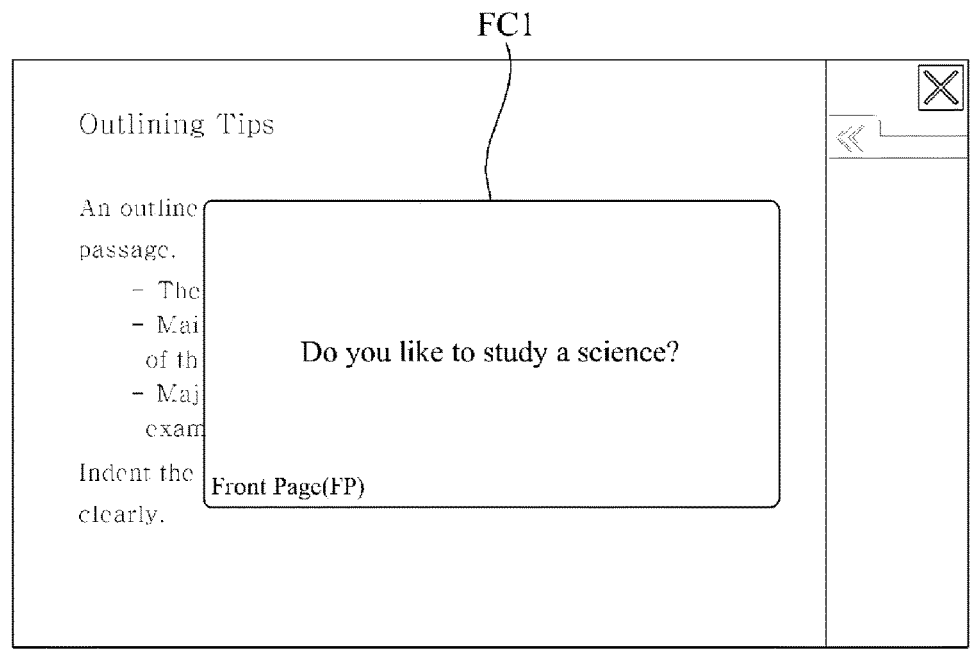
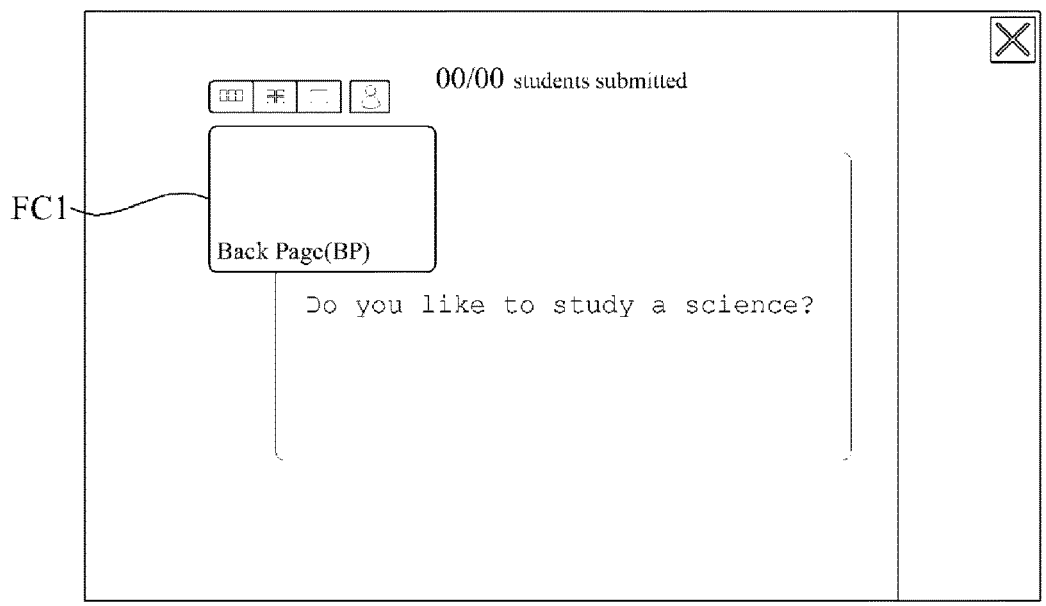

FIG. 8
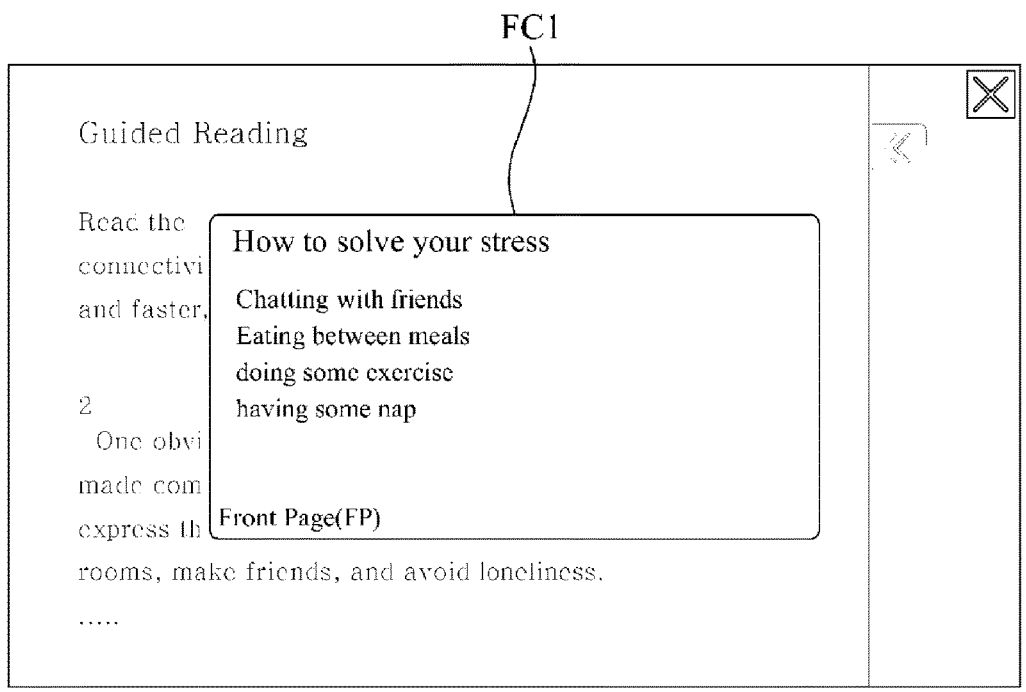
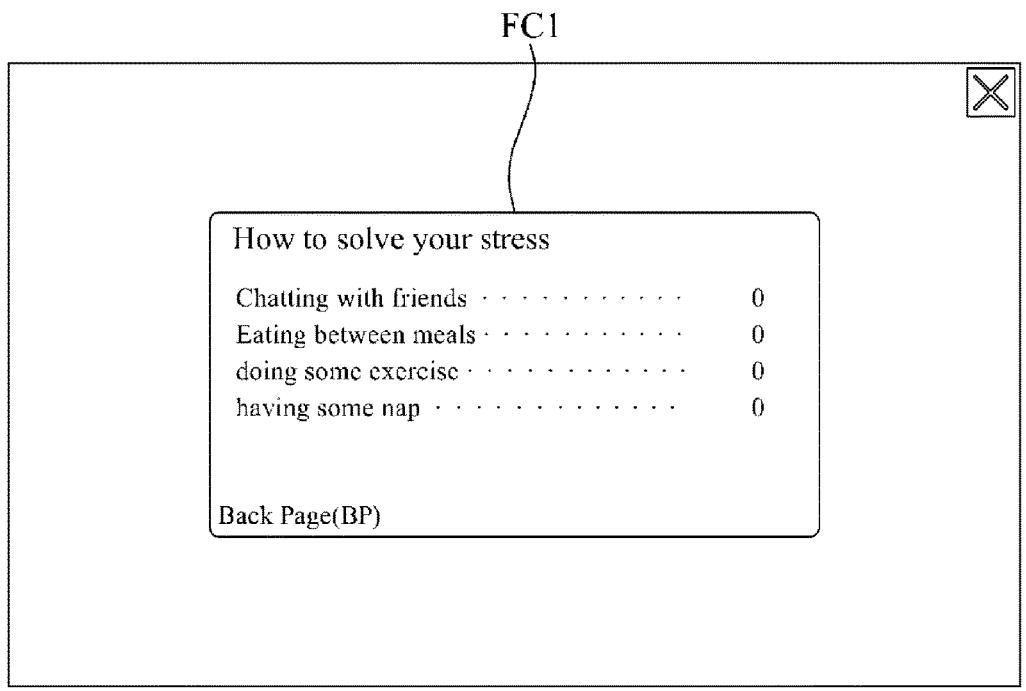

FIG. 9
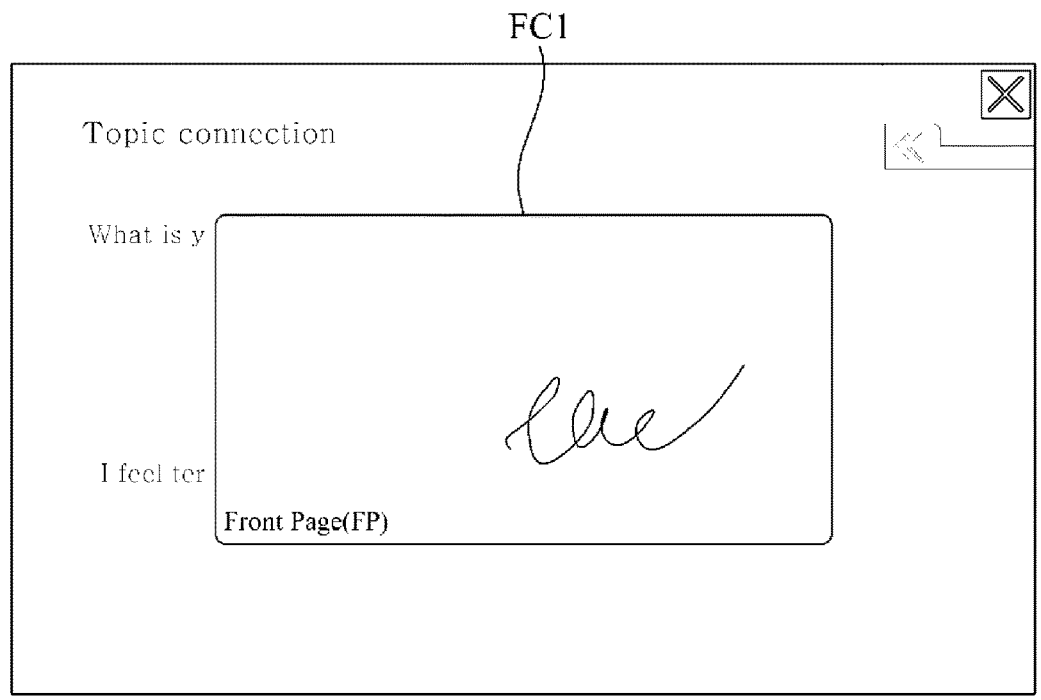
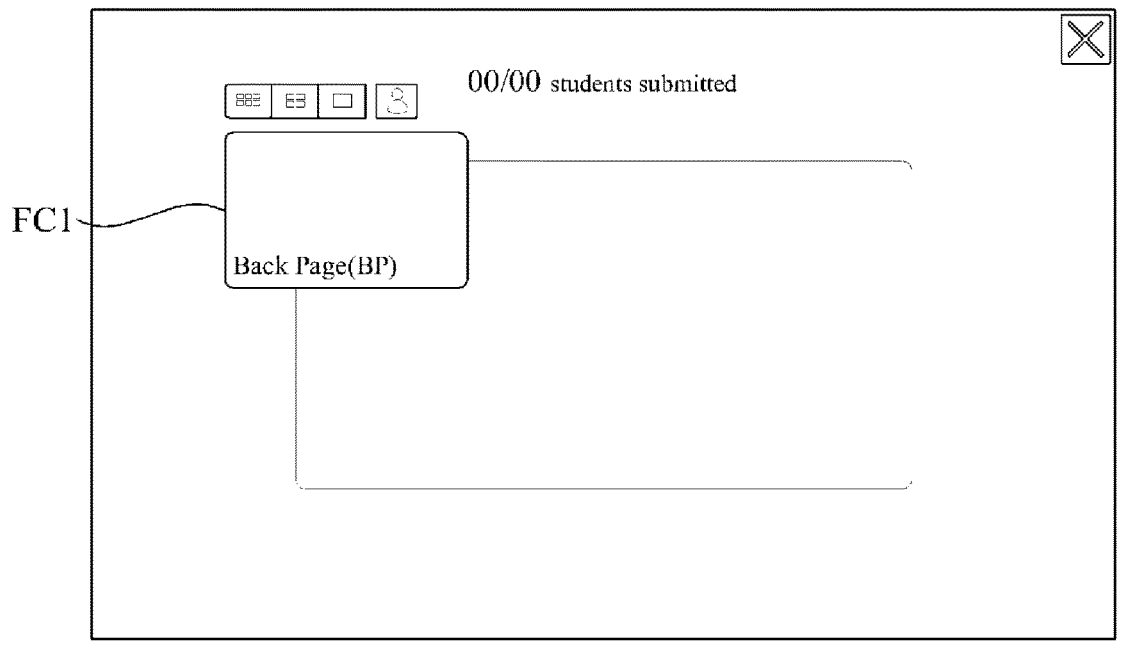

FIG. 11

Comprehension

Put each advice under the correct stress management tip.

Be less dependent on caffeine
Set priorities
Get another perspective
Take matters one at a time
Go for a walk

| Setting realistic goals | Creating a study group | Adopting a healthier lifestyle |

710 correct answers
<6

---

Flash Card

Comprehension

Put each advice under the correct stress management tip.

Be less dependent on caffeine
Set priorities
Get another perspective
Take matters one at a time
Go for a walk

~FC1

| Setting realistic goals | Creating a study group | Adopting healthier lif | cancel

FIG. 13A

```
<CDL.MediaCard type="ImageCard">
    <Publishing.Info publishind.date="2013.04.03.13.45"'>Shannon</Publishing.Info>
    <Owner.Info received.date="2013.04.05.13.45"'>Donaldos</Owner.Info>
    <Contents.Info level="Par" program="c1" book_no="1" lesson_no="2" lesson_name="Virtual or Reality?" page_no="13" x="230" y="500">
        <FrontPage.Info contents_type="image">..\img\img_20130204i245.jpg</FrontPage.Info>
        <BackPage.Info contents_type="image">..\img\img_20130204i245.jpg</BackPage.Info>
    </Contents.Info>
</CDL.MediaCard>
```

FIG. 13B

```
<CDL.MediaCard type="TextCard">
  <Publishing.Info publishind.date="2013.04.03.13.45">Shannon</Publishing.Info>
  <Owner.Info received.date="2013.04.05.13.45">Donaldos</Owner.Info>
  <Contents.Info level="Par" program="C1" book_no="1" lesson_no="2" lesson_name="Virtual or Reality?" page_no="13" x="230" y="500">
    <FrontPage.Info contents_type="Text" font_type="" fond_color="black" font_size="12">What are you doing on vacation?</FrontPage.Info>
    <BackPage.Info contents_type="Text" font_type="" fond_color="black" font_size="12">I will go to the beach with my family.</BackPage.Info>
  </Contents.Info>
</CDL.MediaCard>
```

FIG. 13C

```
<CDL.MediaCard type="ShortAnswer">
<Publishing.Info publishind.date="2013.04.03.13.45">Shannon</Publishing.Info>
<Owner.Info received.date="2013.04.05.13.45">Donaldos</Owner.Info>
<Contents.Info level="Par" program="C1" book_no="1" lesson_no="2" lesson_name="Virtual or Reality" page_no="13" x="230" y="500">
  <FrontPage.Info contents_type="Text" font_type="" fond_color="black" font_size="12">What are you doing on vacation?</FrontPage.Info>
  <BackPage.Info contents_type="Student.Answer"></BackPage.Info>
</Contents.Info>
</CDL.MediaCard>
```

FIG. 13D

```
<CDL.MediaCard type="MultipleChoiceCard">
<Publishing.Info publishind.date="2013.04.03.13.45">Shannon</Publishing.Info>
<Owner.Info received.date="2013.04.05.13.45">Donaldos</Owner.Info>
<Contents.Info level="Par" program="C1" book_no="1" lesson_no="2" lesson_name="Virtual or Reality?" page_no="13" x="230" y="500">
<FrontPage.Info contents_type="Text" font_type="" fond_color="black" font_size="12">
<Qustion.Script>What are you doing on vacation?</Qustion.Script>
<Answer.Script no="1">I will go to travel with my fater.</Answer.Script>
<Answer.Script no="2">I will study Engish very hard.</Answer.Script>
<Answer.Script no="3">I will read a lot books.</Answer.Script>
</FrontPage.Info>
<BackPage.Info contents_type="Student.answer"></BackPage.Info>
</Contents.Info>
</CDL.MediaCard>
```

FIG. 13E

```
<CDL.MediaCard type="Webcard">
  <Publishing.Info publishind.date="2013.04.03.13.45">Shannon</Publishing.Info>
  <Owner.Info received.date="2013.04.05.13.45">Donaldos</Owner.Info>
  <Contents.Info level="Par" program="C1" book_no="1" lesson_no="2" lesson_name="Virtual or Reality?" page_no="13" x="230" y="500">
    <FrontPage.Info contents_type="Web">http://edition.cnn.com/2013/07/21/us/ohio-bodies-found/index.html?hpt=hp_t1<FrontPage.Info>
    <BackPage.Info contents_type="not"></BackPage.Info>
  </Contents.Info>
</CDL.MediaCard>
```

METHOD OF PROVIDING FLASH CARD AND APPARATUSES PERFORMING THE SAME

FIELD

The following embodiments relate to a method of providing a flash card and apparatuses for performing the method.

BACKGROUND

Currently, the market of electronic books (e-books) has been expanded. In addition to the supply market for providing or selling e-books, the market of terminals used to execute e-books has been increasing.

E-books are generally used as teaching materials in schools and institutions, for example. A lecturer and a learner may record additional information to content to be learned from an e-book using a tool such as a pen, a post-it, and a highlighter.

SUMMARY

At least one disclosed embodiment of the invention provides a technique of creating additional information on a corresponding page of an electronic book (e-book) currently being displayed as a flash card.

At least one disclosed embodiment of the invention also provides a technique of distributing a created flash card.

At least one disclosed embodiment of the invention provides a technique of downloading and learning flash cards distributed from a plurality of creators.

According to at least one embodiment of the invention, there is provided a method of providing a flash card in a learning system comprising a first terminal and second terminals, the method comprising: creating, by the first terminal, a first flash card associated with a corresponding page of an electronic book (e-book) currently being displayed on a display of the first terminal; and transmitting, by the first terminal, the first flash card to the second terminals.

The creating of the first flash card may include: defining, by the first terminal, the first flash card on the corresponding page; and creating, by the first terminal, first data on a front page of the first flash card in response to a first input from a user of the first terminal.

The creating of the first flash card may include creating, by the first terminal, second data associated with the first data on a back page of the first flash card in response to a second input from the user of the first terminal.

The defining of the first flash card may include: receiving, by the first terminal, a selection on a type of the first flash card; and displaying, by the first terminal, a creation environment of the first flash card based on the selected type of the first flash card.

The creation environment may include a preview function, a delete function, a save function, a font control function, a switch function, and a text information input function.

The transmitting may include verifying attendances of users of the second terminals and transmitting the first flash card to a terminal of at least one user having attended among the second terminals based on a result of the verifying.

The flash card providing method may further include calculating, by the first terminal, a number of users of the second terminals having answered the respective items included in a multiple choice type based on responses to the first flash card that are output from the second terminals, and indicating a number of users corresponding to each item when the first flash card is provided in the multiple choice type.

The creating of the first flash card may include creating, by the first terminal, the first flash card using a capturing method or an authoring tool.

The creating of the first flash card may include creating, by the first terminal, the first flash card to be at least one of a text type, an image type, a short answer type, a multiple choice type, a drawing type, and a web link type.

The learning system may further include an operating server, and the flash card providing method may further include transmitting, by the first terminal, the first flash card to the operating server to manage the first flash card.

The flash card providing method may further include providing, by the first terminal, a learning activity to a user of the first terminal using the first flash card.

The flash card providing method according to an embodiment may be stored in a non-transitory computer-readable recording medium configured using a computer program.

According to another embodiment, there is provided a flash card providing apparatus, comprising: a processing module configured to create a flash card associated with a corresponding page of an e-book currently being displayed on a display; and a transceiving module configured to transmit the created flash card to at least one terminal.

The transceiving module may be configured to verify an attendance of a user of the at least one terminal, and to transmit the flash card to the at least one terminal based on a result of the verifying.

The flash card providing apparatus may further include a learning module configured to provide a learning activity to a user of the flash card providing apparatus using the created flash card.

According to at least one embodiment of the invention, it is possible to provide a technique of creating additional information on a corresponding page of an electronic book (e-book) currently being displayed as a flash card, and distributing the created flash card.

BRIEF DESCRIPTION OF DRAWINGS

FIG. 5 illustrates an example of a type of a flash card.

FIG. 6 illustrates another example of a type of a flash card.

FIG. 7 illustrates still another example of a type of a flash card.

FIG. 8 illustrates still another example of a type of a flash card.

FIG. 9 illustrates still another example of a type of a flash card.

FIG. 11 illustrates yet another example of a method of creating a flash card.

FIGS. 13A through 13E illustrate an example of information included in a flash card according to at least one embodiment.

DESCRIPTION

Figure 1:
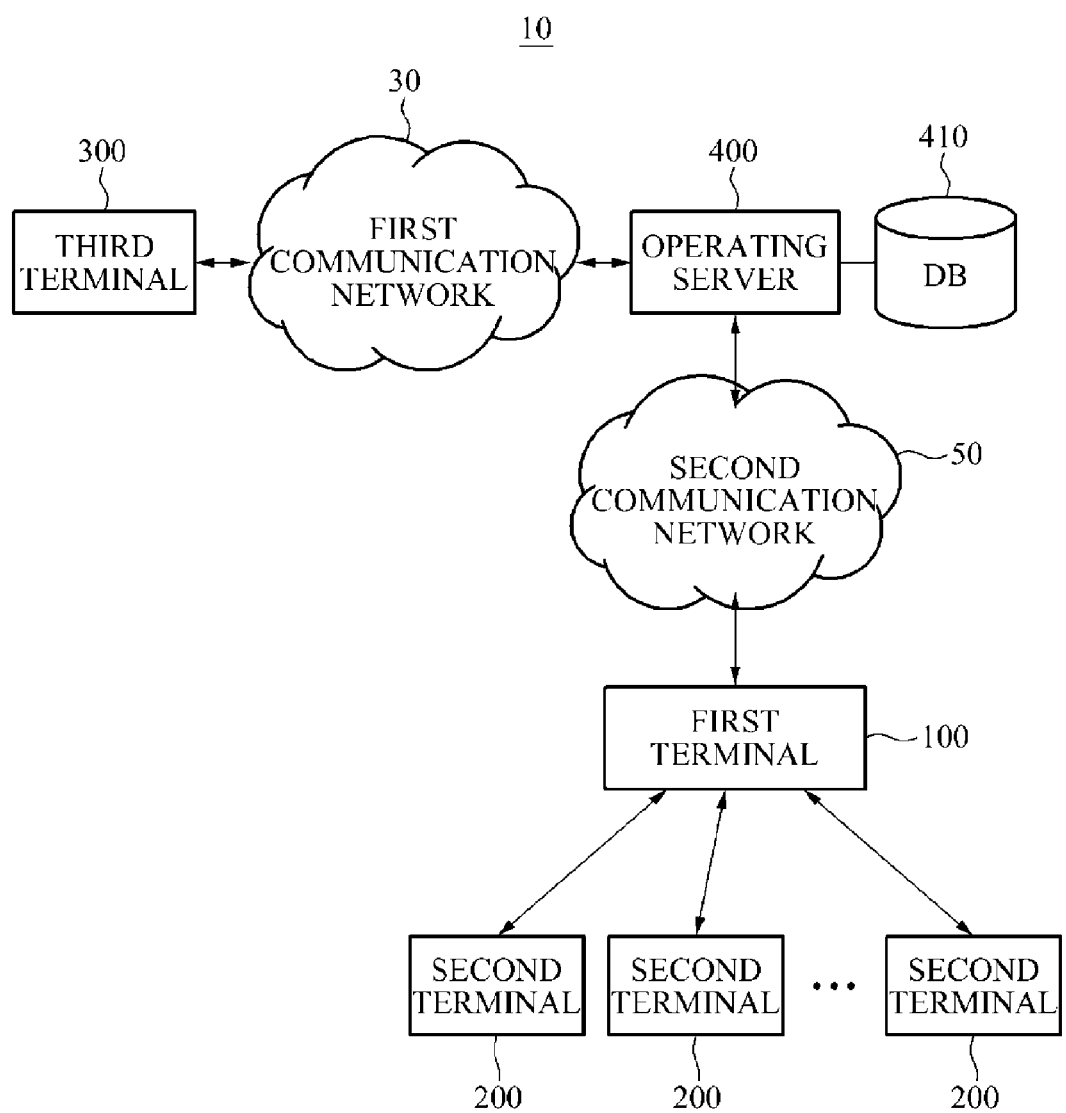
FIG. 1 is a block diagram illustrating a learning system according to at least one embodiment.

Reference will now be made in detail to exemplary embodiments of the invention, examples of which are illustrated in the accompanying drawings, wherein like reference numerals refer to like elements throughout. The embodiments are described below in order to explain the present disclosure by referring to the figures.

Figure 2:
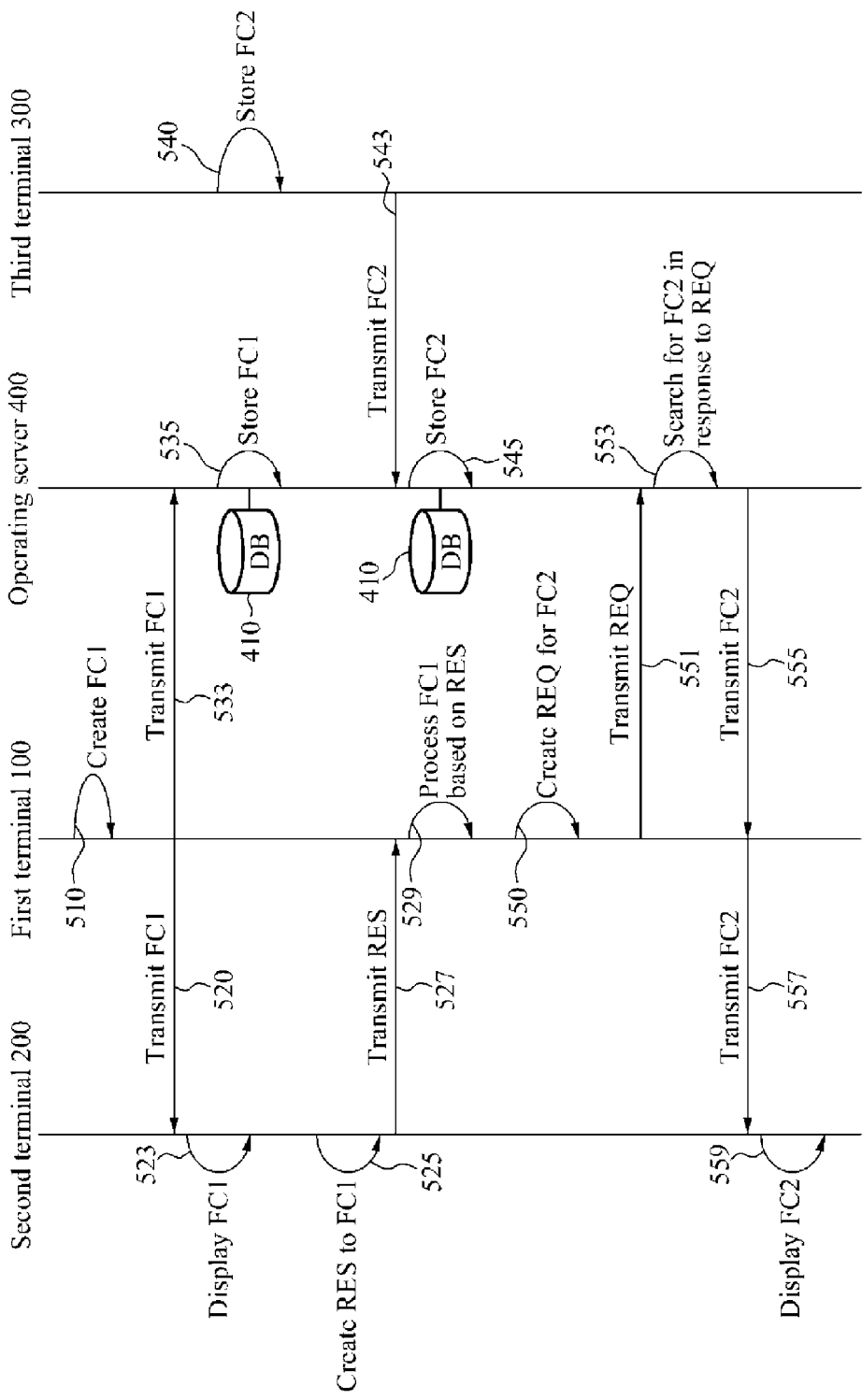
FIG. 2 illustrates a data flow of the learning system of FIG. 1.

FIG. 1 is a block diagram illustrating a learning system according to an embodiment, and FIG. 2 illustrates a data flow of the learning system of FIG. 1.

Referring to FIGS. 1 and 2, a learning system 10 may include a first terminal 100 and second terminals 200. According to an embodiment, the learning system 10 may further include an operating server 400. According to another embodiment, the learning system 10 may further include a third terminal 300.

The first terminal 100, the second terminal 200, or the third terminal 300 may be configured as a portable electronic device.

The portable electronic device may be a laptop computer, a mobile phone, a smart phone, a tablet personal computer (PC), a mobile Internet device (MID), a personal digital assistant (PDA), an enterprise digital assistant (EDA), a digital still camera, a digital video camera, a portable multimedia player, a personal navigation device or a portable navigation device (PND), a handheld game console, or an electronic book (e-book).

The first terminal 100 may communicate with the operating server 400 over a second communication network 50. The third terminal 300 may communicate with the operating server 400 over a first communication network 30. For example, each of the first communication network 30 and the second communication network 50 may be an Internet communication network, a local area network (LAN), a wireless LAN, or Institute of Electronics and Electrical Engineers (IEEE) 802.11 based wireless fidelity (Wi-Fi).

Referring to FIG. 1, the first terminal 100 communicates with the operating server 400 over the second communication network 50 and the third terminal 300 communicates with the operating server 400 over the first communication network 30, but communication of corresponding two apparatuses is not limited to the aforementioned communication network.

The first terminal 100 may communicate with the second terminals 200. For example, the first terminal 100 may communicate with the second terminals 200 through the aforementioned communication network or a wireless communication apparatus. The wireless communication apparatus may be a near field communication (NFC) apparatus, a Bluetooth communication apparatus, or any other communication apparatuses known to one of those skilled in the art.

The first terminal 100 and the third terminal 300 may be registered to the operating server 400 that provides a flash card providing service. The second terminals 200 may be registered to the operating server 400 that provides a flash card providing service.

A flash card providing service application capable of executing the method of FIGS. 1 and 2 may be installed and executed in the first terminal 100, the second terminals 200, and the third terminal 300, and may perform a function associated with a flash card providing service.

For example, the flash card providing service application may perform a function of creating a flash card, a function of transmitting the flash card, a function of displaying the flash card, a function of editing the flash card, a function of learning the flash card, and a function of registering the flash card to the operating server 400.

According to an embodiment, the flash card providing service application may be downloaded and installed from the operating server 400.

According to another embodiment, the flash card providing service application may be downloaded and installed from App Store or Android Market.

In operation 510, the first terminal 100 may create a first flash card FC1 associated with a corresponding page of an e-book currently being displayed on a display of the first terminal 100. For example, the first terminal 100 may create the first flash card FC1 associated with content, for example, a sentence, a static image, and/or a dynamic image, included in the corresponding page. For example, the first terminal 100 may create the first flash card FC1 associated with the content that is disposed at a predetermined location of the corresponding page. The first flash card FC1 may include location information of the content. The location information may include page information and/or line information on the content.

According to an embodiment, the first terminal 100 may create the first flash card FC1 using a method of capturing a corresponding page of an e-book currently being displayed on a display of the first terminal 100.

According to another embodiment, the first terminal 100 may create the first flash card FC1 using an authoring tool.

A method of creating the first flash card FC1 using the capturing method and the authoring tool is described with reference to FIG. 10A through FIG. 11.

Figure 3:
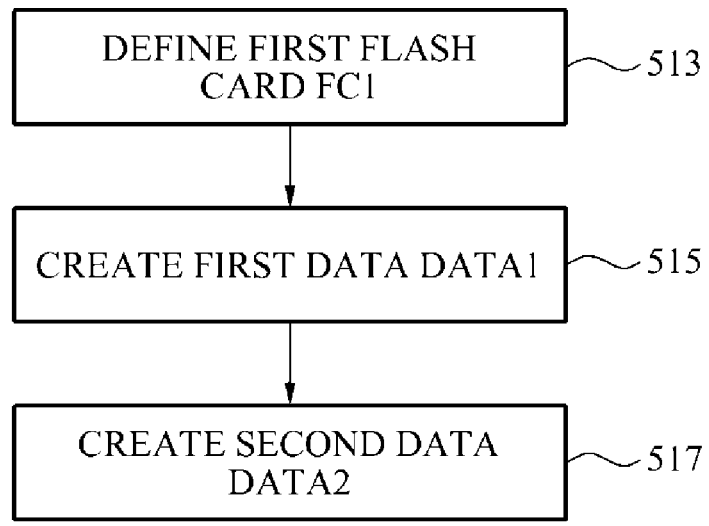
FIG. 3 illustrates a data flow of a method of creating a flash card according to at least one embodiment.

FIG. 3 illustrates a data flow of a method of creating a flash card according to an embodiment.

Referring to FIGS. 1 through 3, the first terminal 100 may define the first flash card FC1 on the corresponding page currently being displayed on the display of the first terminal 100 in operation 513.

Figure 4:
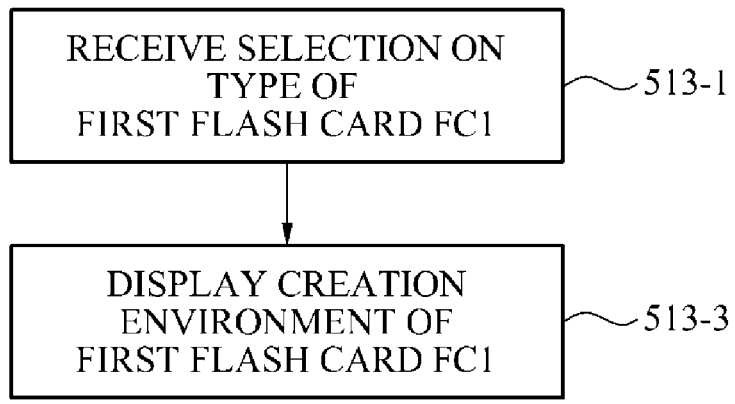
FIG. 4 illustrates a data flow of a method of defining a flash card according to at least one embodiment.

FIG. 4 illustrates a data flow of a method of defining a flash card according to an embodiment.

Referring to FIGS. 1 through 4, the first terminal 100 may receive a selection on a type of the first flash card FC1 from a user of the first terminal 100 in operation 513-1.

According to an embodiment, the type of the first flash card FC1 may include a text type, an image type, a short answer type, a multiple choice type, a drawing type, a web link type, and the like. The type of the first flash card FC1 will be further described with reference to FIGS. 5 through 9.

For example, the first terminal 100 may create the first flash card FC1 as at least one of the text type, the image type, the short answer type, the multiple choice type, the drawing type, and the web link type, based on the selection of the user.

In operation 513-3, the first terminal 100 may display a creation environment of the first flash card FC1 based on the selected type of the first flash card FC1.

According to an embodiment, the creation environment may include a preview function, a delete function, a save function, a font control function, a switch function, a text information input function, and the like.

In operation 515, the first terminal 100 may create first data DATA1 on a front page of the first flash card FC1 defined in response to a first input from the user of the first terminal 100.

In operation 517, the first terminal 100 may create second data DATA2 associated with the first data DATA1 on a back page of the first flash card FC1 defined in response to a second input from the user of the first terminal 100. For example, the first data DATA1 may be a question and the second data DATA2 may be shared information on the question. For example, the shared information may include an answer to the question, a solution process of the question, and the like.

For example, the user of the first terminal 100 may input the first input and/or the second input to the first terminal 100 based on the creation environment provided from the first terminal 100.

The first terminal 100 may create, as a flash card, additional learning information on a corresponding page of an e-book currently being displayed on the display of the first terminal 100. For example, the first terminal 100 may create additional learning information on content, for example, a sentence, a static image and/or a dynamic image, disposed at a predetermined location of the corresponding page, as a flash card that includes location information of the content. The location information may include page information and/or line information on the content.

In operation 520, the first terminal 100 may transmit the created first flash card FC1 to the second terminals 200.

According to an embodiment, the first terminal 100 may verify attendances of users of the second terminals 200, and may transmit the first flash card FC1 to a terminal of at least one user having attended among the second terminals 200 based on a result of the verifying.

For example, the first terminal 100 and the second terminals 100 may be located in the same space and/or different spaces in which a class or a learning is ongoing. The first terminal 100 may be a terminal for teaching and the second terminals 200 may be terminals for learning.

In operation 523, each of the terminals 200 may display the first flash card FC1 transmitted from the first terminal 100 on a display.

In operation 525, each of the second terminals 200 may create a response RES to the first flash card FC1 in response to an input from a user of each of the second terminals 200.

For example, in response to an input from a user of each of the second terminals 200, each corresponding second terminal 200 may create second data DATA2 associated with the first data DATA1 as a response RES to the first flash card FC1 on a back page of the first flash card FC1.

In operation 527, each of the second terminals 200 may transmit the created response RES to the first terminal 100.

In operation 529, the first terminal 100 may process the first flash card FC1 based on the responses RES transmitted from the respective second terminals 200.

For example, when the first flash card FC1 is provided in a multiple choice type, the first terminal 100 may calculate a number of users of the second terminals 200 having answered the respective items included in the multiple choice type based on the responses RES, and may indicate a number of users corresponding to each item.

In operation 533, the first terminal 100 may transmit the created first flash card FC1 to the operating server 400.

In operation 535, the operating server 400 may store, in a database (DB) 410, the first flash card FC1 transmitted from the first terminal 100.

In operation 540, the third terminal 300 may create a second flash card FC2 associated with a corresponding page of an e-book currently being displayed on a display of the third terminal 300. For example, a user of the third terminal 300 may be a creator who creates a flash card on the e-book, and provides the created flash card to other users using the same e-book.

The third terminal 300 may create the second flash card FC2 in the same manner that the first terminal 100 creates the first flash card FC1.

In operation 543, the third terminal 300 may transmit the created second flash card FC2 to the operating server 400.

In operation 545, the operating server 400 may store, in the DB 410, the second flash card FC2 transmitted from the third terminal 300.

The user of the first terminal 100 may require a flash card associated with an e-book displayed on the display of the first terminal 100, in addition to the created first flash card FC1.

In operation 550, the first terminal 100 may create a request signal REQ for the second flash card FC2 in response to a request of the user. For example, the second flash card FC2 may be a flash card created using an e-book associated with the first flash card FC1.

In operation 551, the first terminal 100 may transmit the created request signal REQ for the created second flash card FC2 to the operating server 400.

In response to the request signal REQ transmitted from the first terminal 100, the operating server 400 may search for a flash card, for example, the first flash card FC1 or the second flash card FC2 stored in the DB 410.

For example, in response to the request signal REQ for the second flash card FC2, the operating server 400 may search the DB 410 for the second flash card FC2 in operation 553.

In operation 555, the operating server 400 may extract the second flash card FC2 from the DB 410, and may transmit the extracted second flash card FC2 to the first terminal 100.

In operation 557, the first terminal 100 may transmit, to the second terminals 200, the second flash card FC2 transmitted from the operating server 400.

In operation 559, each of the second terminals 200 may display the transmitted second flash card FC2 on a display of each corresponding second terminal 200.

For example, when the first terminal 100 is a terminal for teaching, the first terminal 100 may download a flash card, for example, the second flash card FC2, used for a teaching material or a learning material from the operating server 400, and may transmit the downloaded flash card to the second terminals 200, thereby utilizing the downloaded flash card, for example, the second flash card FC2, as an additional teaching material or learning material.

A type of a flash card is described with reference to FIGS. 5 through 9. For clarity of description, the type of the flash card is described based on an operation of the first terminal 100 that creates the first flash card FC1.

FIG. 5 illustrates an example of a type of a flash card.

Referring to FIG. 5, a first flash card FC1 of FIG. 5 may be a flash card of an image type.

In response to a first input from a user of the first terminal 100, the first terminal 100 may create first data DATA1 on a front page FP of the first flash card FC1.

In response to a second input from a user of the first terminal 100, the first terminal 100 may create second data DATA2 on a back page BP of the first flash card FC1.

The second data DATA2 may be associated with the first data DATA1.

Referring to FIG. 5, the first terminal 100 may create the first data DATA1 and the second data DATA2 of the first flash card FC1 to be in an image type.

For example, the first data DATA1 may be a question about a corresponding page of an e-book currently being displayed on the display of the first terminal 100, and the second data DATA2 may be shared information or shared data about the question. The shared information may include an answer to the question, a solution process of the question, a type of an incorrect answer to the question, a rate of incorrect answers of the question, and the like.

For example, the first terminal 100 may create a question using a box of an image type (BLK) on the front page FP of the first flash card FC1, and may create an answer to the question on a corresponding box (BLK) of the back page BP of the second flash card FC2.

FIG. 6 illustrates another example of a type of a flash card.

Referring to FIG. 6, the first flash card FC1 of FIG. 6 may be a flash card of a text type.

In response to a first input from a user of the first terminal 100, the first terminal 100 may create first data DATA1 on a front page FP of the first flash card FC1.

In response to a second input from the user of the first terminal 100, the first terminal 100 may create second data DATA2 on a back page BP of the first flash card FC1.

The second data DATA2 may be associated with the first data DATA1.

Referring to FIG. 6, the first terminal 100 may create the first data DATA1 and the second data DATA2 of the first flash card FC1 to be in a text type.

For example, the first data DATA1 may be a question about a corresponding page of an e-book currently being displayed on the display of the first terminal 100, and the second data DATA2 may be shared information or shared data about the question. The shared information may include an answer to the question, a solution process of the question, a type of an incorrect answer to the question, a rate of incorrect answers of the question, and the like.

For example, the first terminal 100 may create a question of a text type on the front page FP of the first flash card FC1, and may create an answer to the question on the back page BP of the first flash card FC1 as the second data DATA2.

FIG. 7 illustrates still another example of a type of a flash card.

Referring to FIG. 7, the first flash card FC1 of FIG. 7 may be a flash card of a short answer type.

In response to a first input from a user of the first terminal 100, the first terminal 100 may create first data DATA1 on a front page FP of the first flash card FC1.

The first terminal 100 may transmit the first flash card FC1 including the first data DATA1 to the second terminals 200.

In response to an input from a user of each of the second terminals 200, each corresponding second terminal 200 may create second data DATA2 on a back page BP of the first flash card FC1.

The second data DATA2 may be associated with the first data DATA1.

Each of the second terminals 200 may transmit the first flash card FC1 including the second data DATA2 to the first terminal 100.

For example, when the first terminal 100 is a terminal for teaching and the second terminals 200 are terminals for learning, the first terminal 100 may create a question as the first data DATA1 on the front page FP of the first flash card FC1 during a class in response to an input from the user of the first terminal 100, and may transmit the first flash card FC1 including the question to the second terminals 200.

In response to an input from a user of each of the second terminals 200, each corresponding second terminal 200 may create an answer to the question as second data DATA2 on the back page BP of the first flash card FC1, and may transmit the first flash card FC1 including the answer to the first terminal 100.

FIG. 8 illustrates still another example of a type of a flash card.

Referring to FIG. 8, the first flash card FC1 of FIG. 8 may be a flash card of a multiple choice type.

In response to a first input from a user of the first terminal 100, the first terminal 100 may create first data DATA1 on a front page FP of the first flash card FC1.

The first terminal 100 may transmit the first flash card FC1 including the first data DATA1 to the second terminals 200.

In response to an input from a user of each of the second terminals 200, each corresponding second terminal 200 may create second data DATA2 on a back page BP of the first flash card FC1.

The second data DATA2 may be associated with the first data DATA1.

Each of the second terminals 200 may transmit the first flash card FC1 including the second data DATA2 to the first terminal 100.

For example, when the first terminal 100 is a terminal for teaching and the second terminals 200 are terminals for learning, the first terminal 100 may create a question and multiple choices or views as the first data DATA1 on the front page FP of the first flash card FC1 during a class in response to an input from the user of the first terminal 100, and may transmit the first flash card FC1 including the question and the multiple choices to the second terminals 200.

In response to an input from a user of each of the second terminals 200, each corresponding second terminal 200 may select one of the multiple choices to the question as second data DATA2 on the back page BP of the first flash card FC1, and may transmit the first flash card FC1 including the selected choice to the first terminal 100. Here, the first terminal 100 may calculate statistics of choices selected by the respective users of the second terminals 200 based on the second data DATA2 of the first flash card FC1 transmitted from the second terminals 200.

FIG. 9 illustrates still another example of a type of a flash card.

Referring to FIG. 9 a first flash card FC1 of FIG. 9 may be a flash card of a drawing type.

In response to a first input of a user of the first terminal 100, the first terminal 100 may create first data DATA1 on a front page FP of the first flash card FC1.

The first terminal 100 may transmit the first flash card FC1 including the first data DATA1 to the second terminals 200.

In response to an input of a user of each of the second terminals 200, each corresponding second terminal 200 may create second data DATA2 on a back page BP of the first flash card FC1.

The second data DATA2 may be associated with the first data DATA1.

Each of the second terminals 200 may transmit the first flash card FC1 including the second data DATA2 to the first terminal 100.

For example, when the first terminal 100 is a terminal for teaching and the second terminals 200 are terminals for learning, the first terminal 100 may create a drawing as the first data DATA1 on the front page FP of the first flash card FC1 during a class in response to an input from the user of the first terminal 100, and may transmit the first flash card FC1 including the drawing to the second terminals 200.

In response to an input from a user of each of the second terminals 200, each corresponding second terminal 200 may create data about the drawing as second data DATA2 on the back page BP of the first flash card FC1, and may transmit the first flash card FC1 including the data to the first terminal 100. For example, the data about the drawing may include a text, a static image, a dynamic image, emoticon, sound or music, and the like.

Flash cards provided in the image type, the text type, the short answer type, the multiple choice type, and the drawing type are described with reference to FIGS. 5 through 9. However, a flash card according to an embodiment is not limited to a flash card of a predetermined type. Depending on embodiments, the flash card may be a flash card of a web link type connecting to a web or YouTube linked to the flash card in response to a touch on the flash card.

Figure 10A:
FIGS. 10A through 10C illustrate an example of a method of creating a flash card.
Figure 10B:
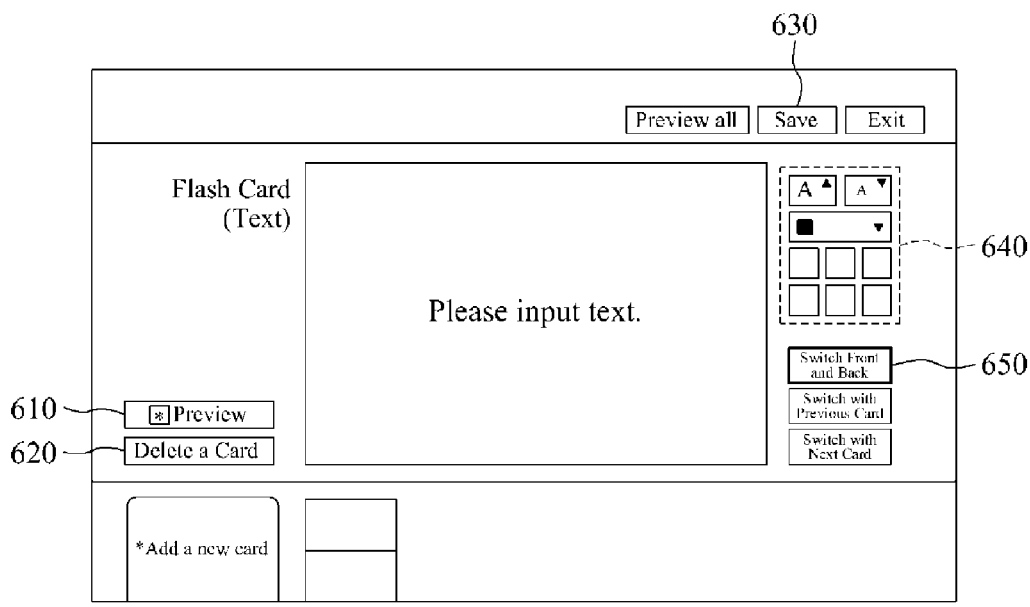
Figure 10C:
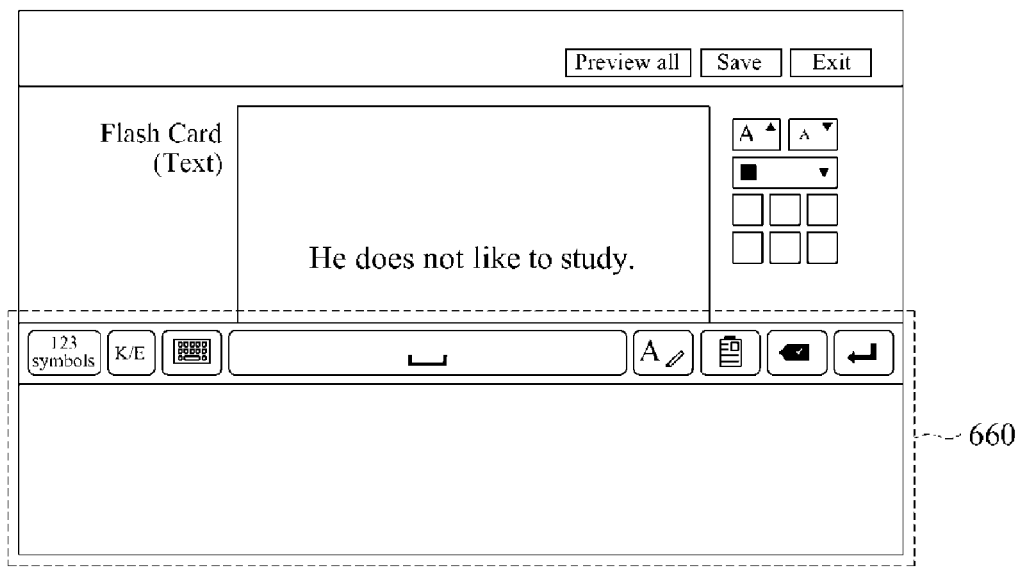

FIGS. 10A through 10C illustrate an example of a method of creating a flash card.

Referring to FIGS. 10A through 10C, the first terminal 100 may create a first flash card FC1 using an authoring tool.

The first terminal 100 may display a type of the first flash card FC1 on a display of the first terminal 100.

The first terminal 100 may receive a selection on the type of the first flash card FC1 from a user of the first terminal 100.

Referring to FIG. 10A, the type of the first flash card FC1 may include a text type, an image type, a short answer type, a multiple choice type, a drawing type, a web link type, and the like.

For example, the first terminal 100 may create the first flash card FC1 to be in at least one of the text type, the image type, the short answer type, the multiple choice type, the drawing type, and the web link type in response to an input of the user.

Referring to FIGS. 10B and 10C, the first terminal 100 may display a creation environment about the first flash card FC1 based on the selected type.

For example, the creation environment may include a preview function 610, a delete function, a save function 630, a font control function 640, a switch function 650, a text information input function 660, and the like.

The font control function 640 may include a font arrangement, a font alignment, a font color, and a font size.

The switch function 650 may include a function of switching between the front page FP and the back page BP of the first flash card FC1.

The user of the first terminal 100 may create first data DATA1 on the front page FP of the first flash card FC1 and/or may create second data DATA2 on the back page BP of the first flash card FC1, based on the creation environment provided from the first terminal 100.

The second data DATA2 may be associated with the first data DATA1.

FIG. 11 illustrates another example of a method of creating a flash card.

Referring to FIG. 11, the first terminal 100 may create a first flash card FC1 using a capturing method.

The first terminal 100 may display a capturing function 710 for the capturing method on a display of the first terminal 100.

Referring to FIG. 11, a user of the first terminal 100 may create the first flash card FC1 using the capturing function 710.

The user of the first terminal 100 may control an area on which the first flash card FC 1 is created. For example, when the display of the first terminal 100 is provided as a touch display, the user of the first terminal 100 may directly magnify or minify and move the area on which the first flash card FC1 is created, displayed on the display of the first terminal 100.

Figure 12:
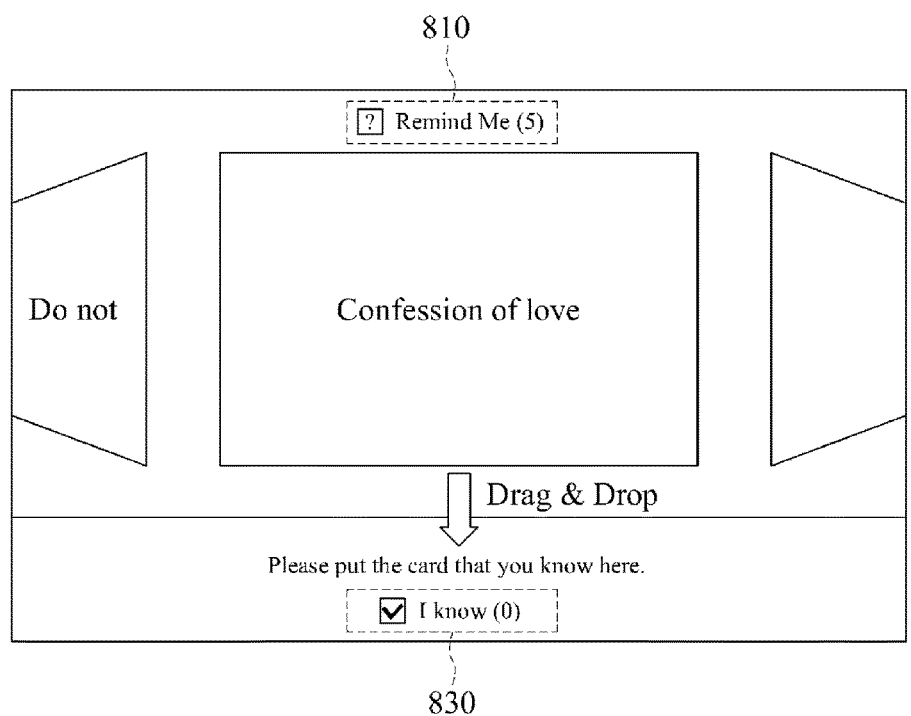
FIG. 12 illustrates a learning activity using a flash card according to at least one embodiment.

FIG. 12 illustrates a learning activity using a flash card according to an embodiment.

Referring to FIG. 12, the first terminal 100 may display a learning activity about a flash card, for example, the first flash card FC1 or the second flash card FC2, stored in the first terminal 100 for a user of the first terminal 100. For example, the first terminal 100 may display, for the user of the first terminal 100, a learning activity of a flash card, for example, the first flash card FC1 or the second flash card FC2, including an English word.

When the user of the first terminal 100 regards that a currently learning flash card, for example, the first flash card FC1 or the second flash card FC2, is not required for a subsequent learning, the user of the first terminal 100 may click on a function button 830 displayed on the terminal of the first terminal 100 or may drag and drop the flash card, for example, the first flash card FC1 and/or the second flash card FC2 in a downward direction.

Conversely, when the user of the first terminal 100 regards that a currently learning flash card, for example, the first flash card FC1 or the second flash card FC2, is required for a subsequent learning, the user of the first terminal 100 may click on a function button 810 displayed on the terminal of the first terminal 100.

FIGS. 13A through 13E illustrate an example of information included in a flash card according to an embodiment.

Referring to FIGS. 13A through 13E, a flash card FC1 or FC2, for example, the first flash card FC1 or the second flash card FC2, may include at least one of page information of a corresponding page of an e-book in which the flash card FC1 or FC2 is created, line information of the corresponding page, type information of the flash card FC1 or FC2, creator information of the flash card FC1 or FC2, distributor information of the flash card FC1 or FC2, and created date information of the flash card FC1 or FC2.

Even though the flash card, for example, the first flash card FC1 or the second flash card FC2 including the aforementioned information is illustrated in FIGS. 13A through 13E, a flash card according to an embodiment is not limited thereto.

Figure 14:
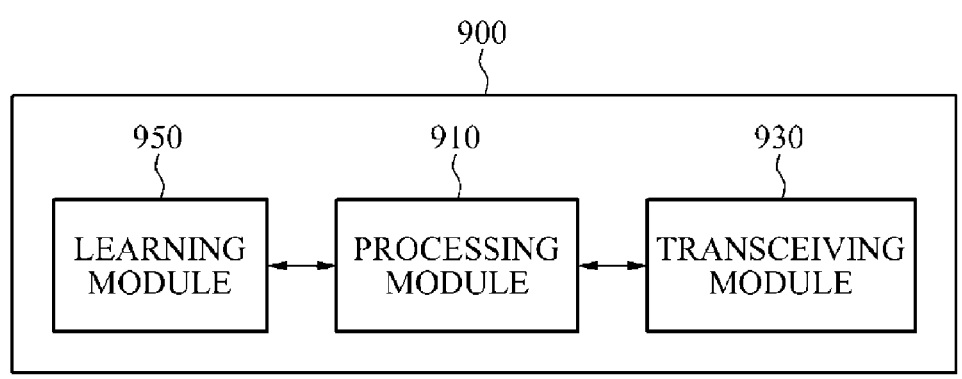
FIG. 14 is a block diagram illustrating a flash card providing apparatus according to at least one embodiment.

FIG. 14 is a block diagram illustrating a flash card providing apparatus according to an embodiment.

Referring to FIG. 14, a flash card providing apparatus 900 may include a processing module 910, a transceiving module 930, and a learning module 950.

The flash card providing apparatus 900 may be the first terminal 100, the second terminals 200, and the third terminal 300, illustrated in FIG. 1.

The processing module 910 may create a flash card associated with a corresponding page of an e-book currently being displayed on a display of the flash card providing apparatus 900.

The transceiving module 930 may transmit the created flash card to another terminal and/or a server.

The learning module 950 may provide a learning activity about the created flash card to a user of the flash card providing apparatus 900.

The description made above with reference to FIG. 1 through FIG. 13E are applicable to the flash card providing apparatus 900 of FIG. 14 and thus, a further description will be omitted.

The units described herein may be implemented using hardware components, software components, and/or combination of hardware components and software components. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, it would be appreciated by those skilled in the art that changes may be made to these embodiments without departing from the principles and spirit of the present disclosure. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of providing a flash card in a learning system comprising a first terminal and a plurality of second terminals, the method comprising:
   creating, by the first terminal, a first flash card associated with a corresponding page of an electronic book (e-book) currently being displayed on a display of the first terminal;
   transmitting, by the first terminal, the first flash card to the plurality of second terminals; and
   providing, by the first terminal, a learning activity for the first flash card to a user of the first terminal, wherein the learning activity includes a first function option and a second function option displayed at the first terminal, the first function option indicating that the first flash card is not required for subsequent learning, and the second function option indicating the first flash card is required for subsequent learning;
   wherein the transmitting comprises verifying attendances of users of the plurality of second terminals and transmitting the first flash card to a terminal of at least one user having attended among the plurality of second terminals based on a result of the verifying,
   wherein the first flash card comprises a front page and a back page of the first flash card,
   wherein the front page of the first flash card switches to the back page of the first flash card in response to a input from a user of the first terminal,
   wherein the first flash card comprises page information of the corresponding page, line information of the corresponding page, type information of the first flash card, created date information of the first flash card, creator information of the first flash card, and distributor information of the first flash card,
   wherein the type information of the first flash card comprises at least one of a text type, an image type, a short answer type, a multiple choice type, a drawing type, and a web link type,
   wherein the creating of the first flash card comprises:
      defining, by the first terminal, the first flash card on the corresponding page, and
      creating, by the first terminal, first data on the front page of the first flash card in response to a first input from a user of the first terminal,
      creating, by the first terminal, second data associated with the first data on the back page of the first flash card in response to a second input from the user of the first terminal, and
   wherein the defining of the first flash card comprises:
      receiving, by the first terminal, a selection on a type of the first flash card, and
      displaying, by the first terminal, one of a plurality of creation environments of the first flash card based on the selection on the type of the first flash card, wherein the creation environments comprise a preview function, a delete function, a save function, a font control function, a switch function, and a text information input function, wherein the first data on the front page of the first flash card and the second data on the back page of the first flash card is based on the one of the plurality of creation environments, and wherein the switch function provides for switching between the front page and the back page of the first flash card on the display of the first terminal, and wherein the displayed creation environment is varied differently according to the selection of the type.

2. The method of claim 1, further comprising:
calculating, by the first terminal, a number of users of the plurality of second terminals having answered respective items included in a multiple choice type based on responses to the first flash card that are output from the plurality of second terminals, and indicating a number of users corresponding to each item when the first flash card is provided in the multiple choice type.

3. The method of claim 1, wherein the creating of the first flash card comprises creating, by the first terminal, the first flash card using a capturing method or an authoring tool.

4. The method of claim 1, wherein the learning system further comprises an operating server, and
the method further comprises:
transmitting, by the first terminal, the first flash card to the operating server to manage the first flash card.

5. A non-transitory computer-readable recording medium storing a program with instructions which when executed by a processor, causes operations comprising:
providing a flash card in a learning system comprising a first terminal and a plurality of second terminals, the method comprising:
creating, by the first terminal, a first flash card associated with a corresponding page of an electronic book (e-book) currently being displayed on a display of the first terminal;
transmitting, by the first terminal, the first flash card to the plurality of second terminals; and
providing, by the first terminal, a learning activity for the first flash card to a user of the first terminal wherein the learning activity includes a first function option and a second function option displayed at the first terminal, the first function option indicating that the first flash card is not required for subsequent learning, and the second function option indicating the first flash card is required for subsequent learning;
wherein the transmitting comprises verifying attendances of users of the plurality of second terminals and transmitting the first flash card to a terminal of at least one user having attended among the plurality of second terminals based on a result of the verifying,
wherein the first flash card comprises a front page and a back page of the first flash card,
wherein the front page of the first flash card switches to the back page of the first flash card in response to a input from a user of the first terminal,
wherein the first flash card comprises page information of the corresponding page, line information of the corresponding page, type information of the first flash card, created date information of the first flash card creator information of the first flash card and distributor information of the first flash card,
wherein the type information of the first flash card comprises at least one of a text type an image type, a short answer type, a multiple choice type, a drawing type, and a web link type,
wherein the creating of the first flash card comprises:
defining by the first terminal the first flash card on the corresponding page, and
creating, by the first terminal, first data on the front page of the first flash card in response to a first input from a user of the first terminal,
creating, by the first terminal, second data associated with the first data on the back page of the first flash card in response to a second input from the user of the first terminal and wherein the defining of the first flash card comprises:
receiving, by the first terminal, a selection on a type of the first flash card, and
displaying, by the first terminal, one of a plurality of creation environments of the first flash card based on the selection on the type of the first flash card wherein the creation environments comprise a preview function, a delete function, a save function, a font control function, a switch function, and a text information input function, wherein the first data on the front page of the first flash card and the second data on the back page of the first flash card is based on the one of the plurality of creation environments, and wherein the switch function provides for switching between the front page and the back page of the first flash card on the display of the first terminal and wherein the displayed creation environment is varied differently according to the selection of the type.

6. A flash card providing apparatus, comprising:
a memory storing computer-readable instructions; and
a processor configured to execute the computer-readable instructions to,
create a flash card associated with a corresponding page of an electronic book (e-book) currently being displayed on a display of a first terminal;
transmit the created flash card from the first terminal to at least one second terminal;
verify an attendance of a user of the at least one second terminal, and to transmit the flash card to the at least one second terminal based on a result of the verifying; and
provide a learning activity for the first flash card to a user of the first terminal, wherein the learning activity includes a first function option and a second function option displayed at the first terminal, the first function option indicating that the first flash card is not required for subsequent learning, and the second function option indicating the first flash card is required for subsequent learning,
wherein the first flash card comprises a front page and a back page of the flash card,
wherein the front page switches to the back page on which the flash card displayed in response to an input,
wherein the flash card comprises page information of the corresponding page, line information of the corresponding page, type information of the flash card, created date information of the flash card, creator information of the flash card, and distributor information of the flash card,
wherein the type information of the flash card comprises at least one of a text type, an image type, a short answer type, a multiple choice type, a drawing type, and a web link type,
wherein the creation of the first flash card comprises:
defining, by the first terminal, the first flash card on the corresponding page; and
creating, by the first terminal, first data on the front page of the first flash card in response to a first input from a user of the first terminal, and
wherein the defining of the first flash card comprises:
receiving, by the first terminal, a selection on a type of the first flash card, and
displaying, by the first terminal, one of a plurality of creation environments of the first flash card based on the selection on the type of the first flash card, wherein the creation environments comprise a preview function, a delete function, a save function, a font control function, a switch function, and a text information input function, wherein the first data on the front page of the first flash card and the second data on the back page of the first flash card is based on the one of the plurality of creation environments, and wherein the displayed creation environment is varied differently according to the selection of the type.

7. The flash card providing apparatus of claim 6 wherein the processor is configured to execute computer-readable instructions to provide a learning activity to a user of the flash card providing apparatus using the created flash card.

8. The method of claim 1 further comprising:
receiving from at least one of the plurality of second terminals at least one response to the first flash card; and
processing the first flash card based on the received at least one response to the first flash card.

9. The method of claim 8 further comprising:
creating a request for a second flash card after receiving the at least one response to the first flash card; and
transmitting the request for a second flash card to a server remote from the first terminal.

10. The method of claim 9 further comprising:
receiving the second flash card from the server; and
transmitting the second first flash card to the plurality of second terminals.

11. A method of providing a flash card in a learning system comprising a first terminal and a plurality of second terminals, the method comprising:
creating, by the first terminal, a first flash card associated with a corresponding page of an electronic book (e-book) currently being displayed on a display of the first terminal;
transmitting, by the first terminal, the first flash card to the plurality of second terminals; and
providing, by the first terminal, a learning activity for the first flash card to a user of the first terminal, wherein the learning activity includes a first function option and a second function option displayed at the first terminal, the first function option indicating that the first flash card is not required for subsequent learning, and the second function option indicating the first flash card is required for subsequent learning;
wherein the transmitting comprises verifying attendances of users of the plurality of second terminals and transmitting the first flash card to a terminal of at least one user having attended among the plurality of second terminals based on a result of the verifying,
wherein the first flash card comprises a front page and a back page of the first flash card,
wherein the front page of the first flash card switches to the back page of the first flash card in response to a input from a user of the first terminal,
wherein the first flash card comprises page information of the corresponding page, line information of the corresponding page, and type information of the first flash card,
wherein the type information of the first flash card comprises at least one of a text type, an image type, a short answer type, a multiple choice type, a drawing type, and a web link type,
wherein the creating of the first flash card comprises:
defining, by the first terminal, the first flash card on the corresponding page, and
creating, by the first terminal, first data on the front page of the first flash card in response to a first input from a user of the first terminal,
creating, by the first terminal, second data associated with the first data on the back page of the first flash card in response to a second input from the user of the first terminal, and
wherein the defining of the first flash card comprises:
receiving, by the first terminal, a selection on a type of the first flash card, and
displaying, by the first terminal, one of a plurality of creation environments of the first flash card based on the selection on the type of the first flash card, wherein the creation environments comprises a switch function, wherein the first data on the front page of the first flash card and the second data on the back page of the first flash card is based on the one of the plurality of creation environments, and wherein the switch function provides for switching between the front page and the back page of the first flash card on the display of the first terminal, and wherein the displayed creation environment is varied differently according to the selection of the type.

12. The method of claim 11, further comprising:
calculating, by the first terminal, a number of users of the plurality of second terminals having answered respective items included in a multiple choice type based on responses to the first flash card that are output from the plurality of second terminals, and indicating a number of users corresponding to each item when the first flash card is provided in the multiple choice type.

13. The method of claim 11, wherein the creating of the first flash card comprises creating, by the first terminal, the first flash card using a capturing method or an authoring tool.

14. The method of claim 11, wherein the learning system further comprises an operating server, and
the method further comprises:
transmitting, by the first terminal, the first flash card to the operating server to manage the first flash card.

15. A non-transitory computer-readable recording medium storing a program to implement the method according to claim 11.

* * * * *